United States Patent
Browne et al.

(10) Patent No.: US 7,359,820 B1
(45) Date of Patent: Apr. 15, 2008

(54) IN-CYCLE SYSTEM TEST ADAPTATION

(75) Inventors: Michael E. Browne, Staatsburg, NY (US); Andrew P. Wack, Millbrook, NY (US); Monica J. Lemay, Austin, TX (US); Derwin D. Gavin, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/619,412

(22) Filed: Jan. 3, 2007

(51) Int. Cl.
*G06F 19/00* (2006.01)

(52) U.S. Cl. .................. 702/108; 702/68; 702/80; 702/81; 702/118; 702/119; 702/120; 702/121; 702/122; 702/123; 702/183; 702/184; 702/188; 707/10; 714/724; 714/726; 714/733; 717/102; 717/106; 717/107; 717/108

(58) Field of Classification Search ............... 702/108, 702/122, 80, 81; 714/38; 717/102, 106, 717/107; 709/204
See application file for complete search history.

(56) References Cited

U.S. PATENT DOCUMENTS

| | | | |
|---|---|---|---|
| 5,265,101 | A | 11/1993 | Mydill et al. |
| 6,078,189 | A | 6/2000 | Noel |
| 6,915,177 | B2 | 7/2005 | Phan et al. |
| 6,929,962 | B1 | 8/2005 | Chang |
| 2002/0155628 | A1 | 10/2002 | Bulaga et al. |
| 2002/0193892 | A1 | 12/2002 | Bertsch et al. |
| 2005/0102580 | A1* | 5/2005 | House et al. .............. 714/38 |

* cited by examiner

*Primary Examiner*—John Barlow
*Assistant Examiner*—Sujoy Kundu
(74) *Attorney, Agent, or Firm*—John E. Campbell; Jeffrey Giunta; Fleit Kain Gibbons Gutman Bongini & Bianco P.L.

(57) ABSTRACT

Disclosed are a method, information processing system and computer readable medium for performing a system test on a program. The method comprises creating a test plan associated with a system test. The system test is for testing a program within an environment. At least one test trigger to be monitored for during the system test is defined within the test plan. Execution of the system test on a system under test for the at least one test trigger is monitored. An occurrence of the at least one test trigger is determined. The test plan is modified to take into account the occurrence of the at least one test trigger in response to determining the occurrence. Execution of the system test is continued based on the modified test plan.

5 Claims, 4 Drawing Sheets

IN-CYCLE SYSTEM TEST ADAPTATION

FIELD OF THE INVENTION

The present invention generally relates to the field of system testing, and more particularly relates to dynamically adapting system test procedures during the testing cycle.

BACKGROUND OF THE INVENTION

System testing is generally used to test a product such as a software application in an integrated system. A system can include software, hardware, and the like. Current methods for system testing of a product begin with building a test plan. The test plan provides a sparse coverage matrix of a particular product based on its documented design and customer usage cases. The documented design and customer usage cases are generated prior to the product's creation. The system test plan is one of the measurement devices that is used to determine if the quality and function of the product has been verified. After the product is created it can be system tested to identify defects and behavior anomalies, which are reported by the testers. Usually a subset of these defects and anomalies are fixed within the current release cycle.

One problem with the current state of system testing is that the system test plan is created prior the product being created. Therefore, the abilities of any particular development team at any given point in time cannot be taken into account. In any given development team at any particular point in time (which is a particular release cycle of the product) there are certain abilities and weaknesses. For example, contractors may have little experience with deployment tools, the product design, environment and user cases for the product, and the like. The technology being deployed can be new to the team members. The design process can also change during the design of the product or the product implementation can change. These are only a few examples of events that cannot be taken into account if a system test plan is created prior to the product's creation.

Accordingly, a design based system test plan is not an adequate method to discover defects in a product. Design based plans focus on what was thought to be an issue in design, which may not be an issue at all. This causes test resources to be wasted on non-problematic areas leaving other areas not adequately tested.

Therefore a need exists to overcome the problems with the prior art as discussed above.

SUMMARY OF THE INVENTION

Briefly, in accordance with the present invention, disclosed are a method, information processing system, and computer readable medium for performing a system test on a program. The method comprises creating a test plan associated with a system test. The system test is for testing a program within an environment. At least one test trigger to be monitored for during the system test is defined within the test plan. Execution of the system test on a system under test for the at least one test trigger is monitored. An occurrence of the at least one test trigger is determined. The test plan is modified to take into account the occurrence of the at least one test trigger in response to determining the occurrence. Execution of the system test is continued based on the modified test plan.

In another embodiment an information processing system for performing a system test on a program is disclosed. The information processing system comprises a memory and a processor that is communicatively coupled to the memory. The information processing system also comprises a system test module that is communicatively coupled to the memory and the processor. The system test module is for creating a test plan associated with a system test. The system test is for testing a program within an environment. At least one test trigger to be monitored for during the system test is defined within the test plan. Execution of the system test on a system under test for the at least one test trigger is monitored. An occurrence of the at least one test trigger is determined. The test plan is modified to take into account the occurrence of the at least one test trigger in response to determining the occurrence. Execution of the system test is continued based on the modified test plan.

In yet another embodiment, a computer readable medium for performing a system test on a program is disclosed. The computer readable medium comprises instructions for creating a test plan associated with a system test. The system test is for testing a program within an environment. At least one test trigger to be monitored for during the system test is defined within the test plan. Execution of the system test on a system under test for the at least one test trigger is monitored. An occurrence of the at least one test trigger is determined. The test plan is modified to take into account the occurrence of the at least one test trigger in response to determining the occurrence. Execution of the system test is continued based on the modified test plan.

One advantage of the present invention is a new system test process is provided. Test triggers can be defined prior to the start of a system test cycle for triggering a test modification analysis. Based on this triggered analysis, the system test can be dynamically updated with new test cases that are executed in the current test cycle. Therefore, the system test is not completely defined by a design specification, but can be adapted based on the actual product's performance. Another advantage is that the test triggers are self-learning in that once a particular trigger has occurred additional triggers can be created based on the in-cycle learning at that point.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary Testing System

Figure 1:
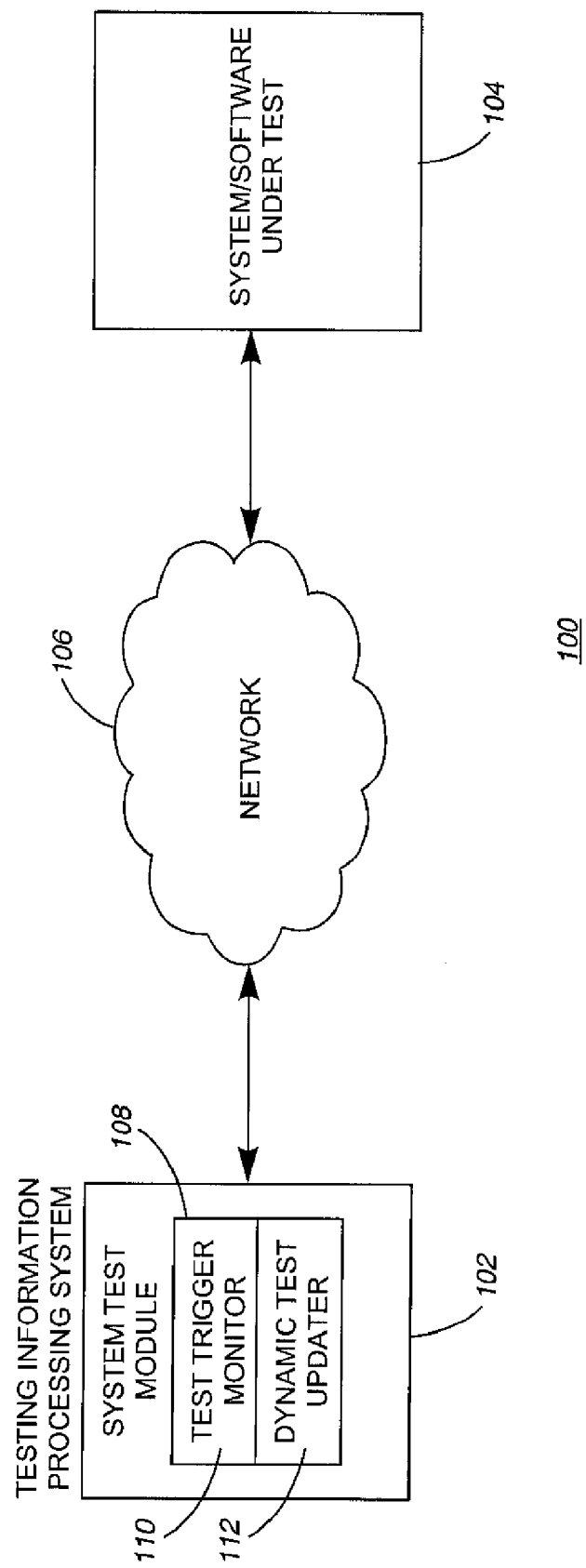
FIG. 1 is a block diagram illustrating an exemplary testing system according to an embodiment of the present invention.

According to an embodiment of the present invention, as shown in FIG. 1, an exemplary testing system 100 is shown. FIG. 1 shows a testing information processing system 102 communicatively coupled to information processing system 104 comprising components or software to be tested. A network 106 such as a local area network, wide area network, or the like couples the two systems 102, 104 to one another. Further embodiments of the present invention connect the two systems 102, 106 together using any suitable communications connection. It should be noted that the testing information processing system 102 can be coupled to a plurality of systems to be tested together or separately. The testing information processing system 102 controls the testing of the system components or software residing on or coupled to the information processing system 104. The testing information processing system 102 includes a system test module 108, which comprises a test trigger monitor 110 and a dynamic test updater 112. These components are discussed in greater detail below.

Testing of a system or software helps ensure that it performs consistently within its functional specifications and that it is compatible with its environment. There are three main areas of testing: unit testing, functional testing, and system testing. Unit testing occurs at the source code level. For example, unit testing confirms that a method produces an expected output when given a known input. A unit test is used to verify that particular source code modules are working properly. Unit tests are generally written from the perspective of the programmer. Functional testing verifies that the system/software is performing how it should. Generally, functional testing confirms that a system or software is performing according to user requirements. System testing tests a product in a system environment to ensure that the product operates satisfactory in the environment it was designed for. Although the following discussion is with respect to system testing, embodiments of the present invention are also applicable to unit testing and functional testing.

Exemplary Information Processing System

Figure 2:
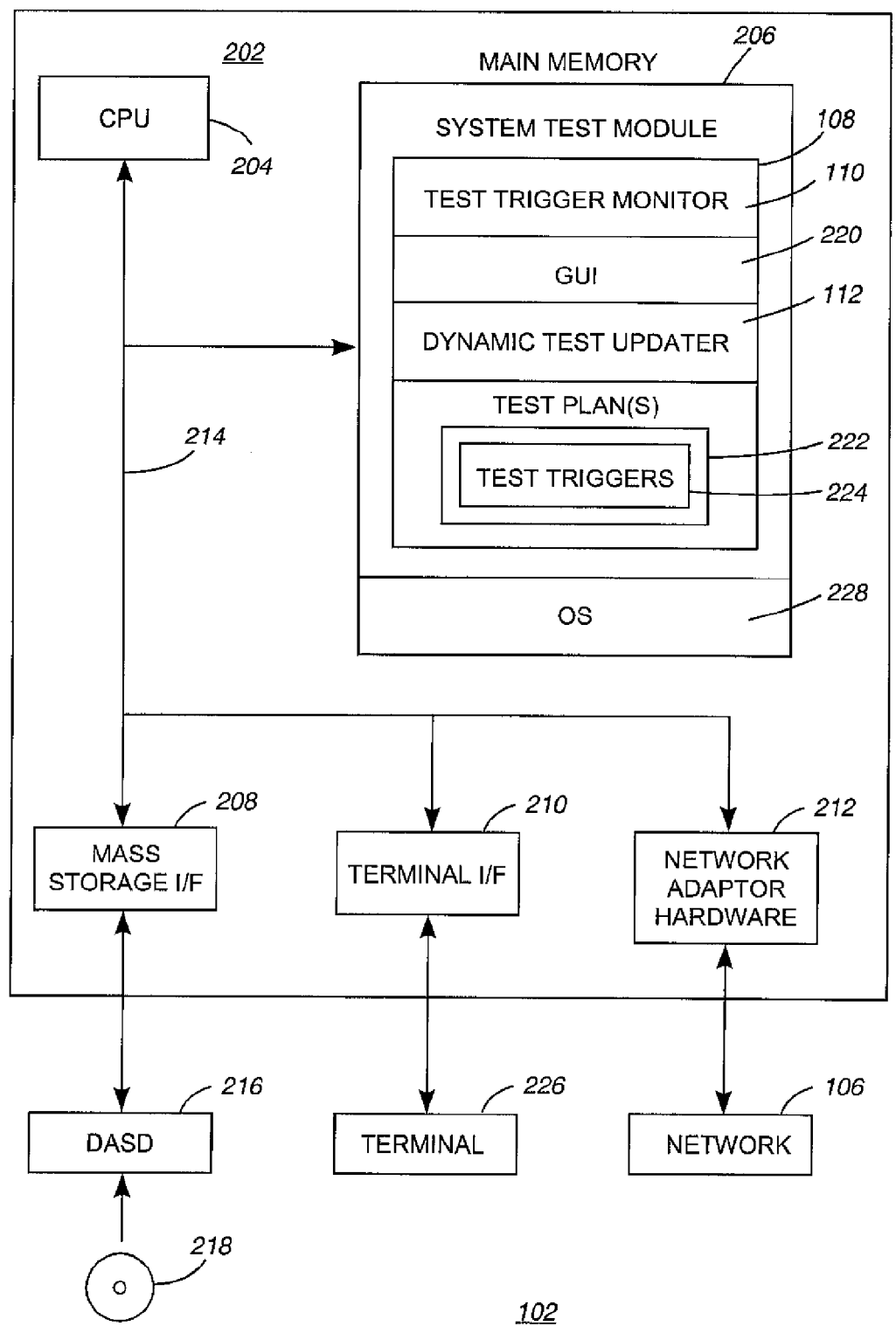
FIG. 2 a more detailed view of an information processing system for performing systems testing functions according to an embodiment of the present invention.

FIG. 2 is a block diagram illustrating a more detailed view of the testing information processing system 102 of FIG. 1.

The information processing system 102 is based upon a suitably configured processing system adapted to implement the exemplary embodiment of the present invention. Any suitably configured processing system is similarly able to be used as the information processing system 102 by embodiments of the present invention, for example, a personal computer, workstation, or the like.

The information processing system 102 includes a computer 202. The computer 202 has a processor 204 that is communicatively connected to a main memory 206 (e.g., volatile memory), mass storage interface 208, a terminal interface 210, and network adapter hardware 212. A system bus 214 interconnects these system components. The mass storage interface 208 is used to connect mass storage devices, such as data storage device 216 to the central server 102. One specific type of data storage device is a computer readable medium such as a CD drive, which may be used to store data to and read data from a CD or DVD 218 or floppy diskette (not shown). Another type of data storage device is a data storage device configured to support, for example, fixed disk type file system operations.

The main memory 206, in one embodiment, includes the system test module 108. The system test module 108 includes the test trigger monitor 110, dynamic test updater 112, graphical user interface 220, and a test plan(s) 222 which includes test triggers 224. These components are discussed in greater detail below. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the information processing system 102

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 226 to computer 202 to provide a user interface to the computer 202. These terminals 226, which are able to be non-intelligent or fully programmable workstations, are used to allow system administrators and users to communicate with the thin client. The terminal 226 is also able to consist of user interface and peripheral devices that are connected to computer 202 and controlled by terminal interface hardware included in the terminal I/F 210 that includes video adapters and interfaces for keyboards, pointing devices, and the like.

An operating system 228 according to an embodiment, can be included in the main memory 206 and is a suitable multitasking operating system such as the Linux, UNIX, Windows XP, and Windows Server operating system. Embodiments of the present invention are able to use any other suitable operating system, or kernel, or other suitable control software. Some embodiments of the present invention utilize architectures, such as an object oriented framework mechanism, that allows instructions of the components of operating system (not shown) to be executed on any processor located within the client. The network adapter hardware 212 is used to provide an interface to the network 106. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk w18, CD ROM, or other form of recordable media, or via any type of electronic transmission mechanism.

In-Cycle System Test Adaptation

The system test module 108 controls system testing of products. A system test is defined by its test plan 224. In one embodiment, a test plan 224 is a set of test cases plus any other additional information that may be required to complete the testing, such as the required environment and context. A system test can be performed manually or can be automated. For manual testing, a tester hard codes each test case. Automated testing utilizes a tool that automatically enters a predetermined set of characters or user commands in order to test a system/software according to a created test plan. In some embodiments of the present invention, the test plan is created based upon user input.

As discussed above test plans for systems tests are generally created prior to the product being created. Therefore, changes in design process that were not foreseen when the test plans were generated are not taken into account. Therefore, any defects or anomalies in the product caused by these changes usually make their way into the current product release. These problems are not corrected until the product's next release cycle. However, the present invention provides a system test method that adaptively changes its test plans in response to detected events or lack of events. Therefore, the dynamic system test of the present invention can account for changes during the design process.

The test plans 224 of the present invention include test triggers 224, which allow for a test cycle to be dynamically modified based on the triggering event. Test triggers 224 can be defined based on areas of concern within the product. For example, problem areas in the product identified during design can be added as triggers 224. Environmental events in the development organization of the product can also be used to define a trigger 224. These are only a few examples on what triggers 224 can be based on. Furthermore, a test trigger 224 can be self-learning.

One example of a self learning trigger is when a predefined trigger causes analysis by a test engineer to determine if the event or events that caused the trigger require new triggers to be designed and deployed. For example, a slow GUI now causes other performance triggers to be defined for other areas that call the same underlying software libraries like associated command line interfaces. A minimum self-learning trigger is one that rearms itself when the event no longer occurs after fixes have been applied to the product and the normal predefined testing can resume.

A test trigger 224 can be generic such that a test modification analysis is performed for each defect found. A test trigger 224 can also be narrow such that a test modification analysis is performed for a specific defect or behavior anomaly. Also, a lack of defects or anomalies can be set as a test trigger 224 to cause a test modification analysis that may improve testing efficiency. A test modification analysis, in one embodiment, analyzes the triggering event and its root cause. This allows the tester or an automated testing system to determine whether new triggers or new test cases should be created.

The test trigger monitor 108 monitors for the triggering events and records each occurrence. A system tester is visually presented with a display of test results including any triggering events through the GUI 220. The system tester can then modify the test plan(s) 222 or create new triggers 224. The testing information processing system 102 of one embodiment is able to create at least one additional test trigger based upon user input. The requested changes are then applied to the system test via the dynamic test updater 112. Furthermore, the dynamic test updater 112 can automatically define new triggers based on a trigger 224 that is detected by the monitor 110 and in-cycle learning up to that point. Reactive changes to the new triggers 224 or new test plans 222 can cause new in-cycle learning and the re-starting the triggering cycle. In one embodiment, the test cycle can be configured to end after a predefined period of time or when triggering events are no longer detected.

One example of in-cycle system test adaptation is as follows. A product to detect overheating in a CPU has been designed. When the product detects overheating it can reduce CPU frequencies and/or increase cooling fan speed. Test engineers develop a test plan to ensure that applications, data I/O, and network communications are unaffected by the overheating response. Test triggers 224 are defined to detect any defect or behavior anomaly outside of the defined applications, data I/O, and network communications. The system test is executed and the applications, I/O, and network communications are not affected by increased fan speed or reduced CPU frequencies.

However, during an upgrade on the user interface to the system, menus appear different and performance is slow. This behavior would normally result in a test failure, but with one embodiment of the present invention, a triggering event occurs and is detected by the test trigger monitor 110. This event can be displayed to a system tester who can associate the event with the product or the system test module 108 can automatically record the event with any information needed to identify event, particular test the event was associated with, and the like. When the test engineers review the test they can recognize that a triggering event occurred and determine context information for the trigger event. In other words, the test engineers recognize that a defect occurred in an area of the system that the test plan was not designed to test. Therefore, the test engineers can modify the test plan to test or accommodate the new graphical interface. Additional triggers can also be added to the test plan.

As can be seen, the present invention provides an advantageous system testing module 206. Current system testing methods that are static would not have detected that defect in the graphical user interface in the above example. Therefore, this defect would have been included in the release of the product. The present invention, on the other hand, includes test triggers 224 that allow for defects and behavior anomalies to be detected even though the test plan is not configured to test for them. The test plan can then be updated in response to the detected triggers 224.

Exemplary Process for in-Cycle System Test Adaptation

Figure 3:
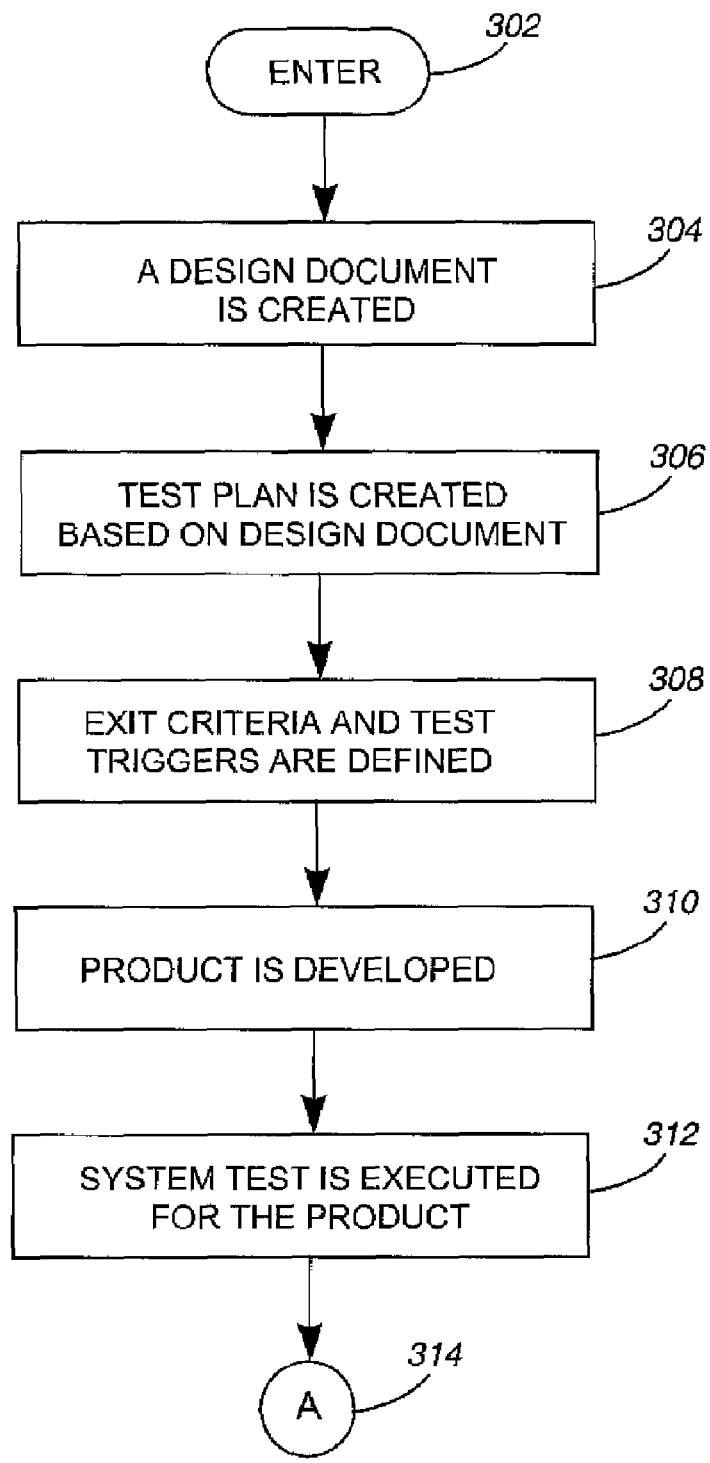
FIG. 3 and FIG. 4 are operational flow diagrams illustrating an exemplary process of dynamically modifying an in-cycle system test based on detected triggering events according to an embodiment of the present invention.
Figure 4:
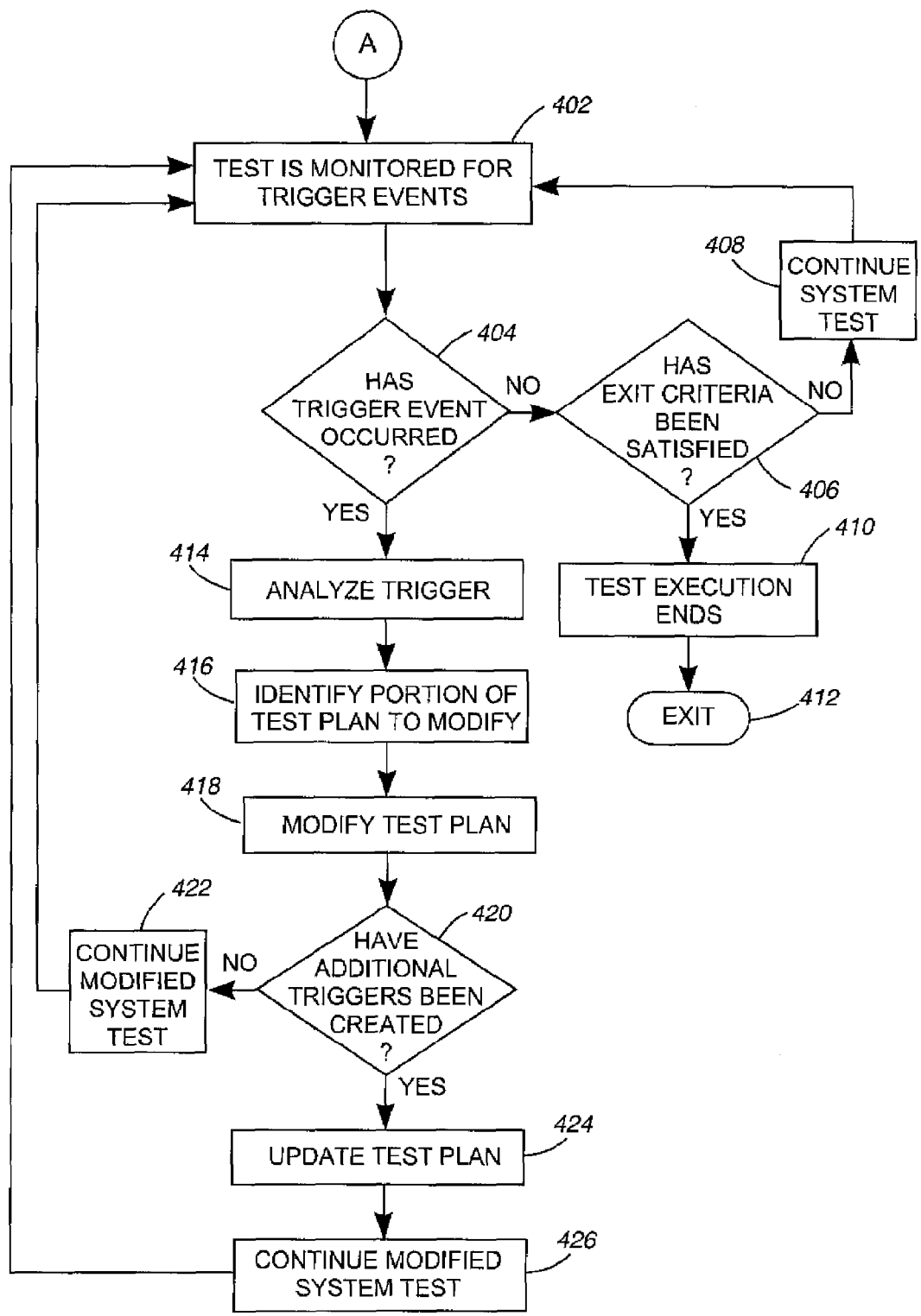

FIG. 3 and FIG. 4 illustrate an exemplary process for modifying a test plan during a system text cycle based on test triggers 224. The operational flow diagram of FIG. 3 begins at step 302 and flows directly to step 304. A design document, at step 304, is created for a product. A test plan, at step 306, is then created based on the design document. Exit criteria and test triggers 224, at step 308, are defined and placed into the test plan. An exit criterion defines when a test cycle can exit out of its cycle. Exemplary exit criteria are a given time interval in which test triggers 224 are no longer detected, and the like.

The product, at step 310, is created and a system test, at step 312, is executed for the product based on the test plan. The control then flows to entry point A of FIG. 4. After the system test is executed at step 312 of FIG. 3, the test, at step 402, is monitored for trigger events. The system test module 108, at step 404, determines if a trigger event has occurred. If the result of this determination is negative, the system test module 108, at step 406, determines if the exit criteria has been satisfied. If the result of this determination is negative, the system test, at step 408, is continued and the control flows back to step 402. It the result of this determination is positive, the test execution, at step 410, ends and the control flow exits at step 412.

If the result of the determination at step 404 is positive, the trigger, at step 414, is analyzed. The analyzing can be performed manually on data presented by the testing information processing system 102 or by an automated system. The triggers are analyzed to identify the defect or behavior anomaly and its underlying cause. Based on the analysis, the portion of the test plan that needs to be modified is identified at step 416. The test plan, at step 418, is modified. For example, new tests and/or existing tests can be combined and inserted into the current test execution. This allows for similar, but different defects to be identified. Also, new triggers 224 can be created and inserted into the current test execution cycle. Test case planned attempts may also be modified based on the trigger analysis.

The system test module 108, at step 420, determines if new triggers have been created. If the result of this determination is negative, the system test, at step 422, is continued with the modified test plan and the control flows back to step 402. If the result of this determination is positive, the test plan, at step 424, is updated with the new triggers and the system test, at step 426, is continued with the modified test plan and new triggers. The control flows back to step 402.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for performing a system test on a program, the method comprising:

creating a test plan associated with a system test, wherein the system test is for testing a program within an environment;

defining within the test plan at least one test trigger to be monitored for during the system test, wherein the at least one test trigger is a self-learning test trigger, wherein the self-learning test trigger creates new test triggers within the test plan based on an event associated with the self-learning test trigger occurring;

monitoring execution of the system test on a system under test for the at least one test trigger;

determining an occurrence of the at least one test trigger;

modifying, in response to determining the occurrence, the test plan to take into account the occurrence of the at least one test trigger; and continuing execution of the system test based on the modified test plan.

2. The method of claim 1 further comprising:

creating, in response to the determining the occurrence, at least one additional test trigger based on the at least one test trigger having occurred; and modifying the test plan to include the at least one additional test trigger.

3. The method of claim 2, wherein the creating the test plan is performed based upon user input.

4. The method of claim 2, wherein the creating the at least on additional test trigger is performed by an automated testing tool.

5. The method of claim 2, further comprising:

monitoring the system test for the at least one test trigger and the at least one additional test trigger.

* * * * *